United States Patent Office 3,116,109
Patented Dec. 31, 1963

3,116,109
PROCESS FOR PRODUCTION OF PHOSPHINE AND PHOSPHITE-FREE PHOSPHATES
Richard W. Cummins, Rahway, N.J., assignor to FMC Corporation, a corporation of Delaware
No Drawing. Filed Mar. 10, 1961, Ser. No. 94,703
7 Claims. (Cl. 23—107)

This invention relates to the production of phosphine by the pyrolysis of hypophosphites and orthophosphites.

Phosphine is produced commercially by the reaction of sodium hydroxide and water on white phosphorus. This reaction may be illustrated by the following equation:

$$4P + 3H_2O + 3NaOH \rightarrow PH_3 + 3NaH_2PO_2$$

The sodium hypophosphite thus produced converts to some extent into hydrogen and sodium orthophosphite by the reaction illustrated below:

$$NaH_2PO_2 + NaOH \rightarrow Na_2HPO_3 + H_2$$

The prior-art process for producing phosphine, described above, has the disadvantage of being able to produce relatively small amounts of phosphine, since 75% of the phosphorus in the feed is used up in producing sodium hypophosphite ($NaH_2PO_2$) and/or sodium orthophosphite ($Na_2HPO_3$). As a result, conversion of these salts into commercially useable products is mandatory, if the above process for producing phosphine is to be economically attractive. Pyrolytic conversion of the hypophosphite and orthophosphite salts has been attempted by the prior art. In the case of the hypophosphite the reaction proceeds as follows:

$$14NaH_2PO_2 \xrightarrow{500°\,C.} 7PH_3 + 7/2Na_4P_2O_7 + 7/2H_2O$$

In the case of orthophosphite salts, pyrolysis does not occur, even at temperatures up to 410° C.

Pyrolysis of these salts has not been found commercially acceptable because of the high temperatures required to bring about conversion. Additionally, the final reaction product, $Na_4P_2O_7$ contains material amounts of phosphite which makes the pyrolysis product unsuitable for commercial phosphate application, such as in the production of glassy phosphates. Most phosphates and particularly glassy phosphates, must be phosphite-free because of the severe reducing property which this impurity possesses. If phosphites are present in glassy phosphate mixtures and the glassy phosphate mixtures are employed in their conventional application as water softeners, the dissolved phosphite will deleteriously attack metal, and other materials which it contacts.

It is an object of the present invention to produce phosphine and a hypophosphite-free glassy phosphate product by conversion of hypophosphite and orthophosphite salts at relatively low reaction temperatures.

These and other objects will be apparent from the following disclosure.

It has now been determined unexpectedly that hypophosphite and orthophosphite salts can be converted to phosphine and a phosphite-free glassy polyphosphate product by heating the salts in the presence of phosphoric acid to temperatures of about 190° C. to 310° C.

These reactions are believed to take place as follows:

$$2NaH_2PO_2 \cdot H_2O + H_3PO_4 \rightarrow PH_3\uparrow + 2NaH_2PO_4 + 2H_2O$$

$$4Na_2HPO_3 \cdot 5H_2O + 5H_3PO_4 \rightarrow PH_3\uparrow + 8NaH_2PO_4 + 20H_2O$$

The phosphate product which is recovered is a colorless glass, which dissolves in water, and at 1% aqueous mixtures gives pH values of 1 to 2. The highly acid nature of this product and its colorless glassy appearance indicates that the product is not sodium dihydrogen phosphate in its conventional form, and that a conversion of the product takes place under the reaction conditions.

It is believed that the sodium dihydrogen phosphate is converted to a short chain, partially neutralized meta phosphoric acid as follows:

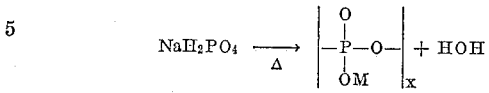

where X is about 6 and M is either H or Na, but where both H and Na are present in the molecule.

The instant process is carried out by heating the orthophosphite and/or hypophosphite with at least about stoichiometric amounts of phosphoric acid. Any suitable form of phosphoric acid, such as orthophosphoric acid, pyrophosphoric acid, superphosphoric acid, and others, may be employed. The reaction takes place at temperatures below those required for pyrolysis of these salts. It has also been found that the molar ratio of the phosphoric acid decreases the temperature at which the hypophosphite reaction proceeds and increases the yield of $PH_3$ recovered from the orthophosphite. The temperatures of reaction and amounts of $PH_3$ recovered may be compared by reference to Tables I and II.

TABLE I

| Mole Ratio, $H_3PO_4/NaH_2PO_2 \cdot H_2O$ | Temperature of Decomposition, °C. | $PH_3$ Recovered [1] | Residue |
|---|---|---|---|
| 0 (No acid added) | 310–316 | 38.0 | White Powder Containing Phosphite. |
| 1 | 230 | 46.0 | Colorless Glass Containing no Phosphite. |
| 2 | 190 | 46.4 | Do. |

[1] Percent phosphite phosphorus converted to phosphine phosphorus.

TABLE II

| Mole Ratio, $H_3PO_4/Na_2HPO_3 \cdot H_2O$ | Temperature of Decomposition, °C. | $PH_3$ Recovered [1] | Residue |
|---|---|---|---|
| 0 (No acid added) | None at 410 | 0 | Brown Powder Containing Phosphite. |
| 1 | 310 | 1.0 | Colorless Glass Containing no Phosphite. |
| 2 | 310 | 13.9 | Do. |
| 3 | 310 | 17.8 | Do. |

[1] Percent phosphite phosphorus converted to phosphine phosphorus.

The present process is an excellent means of increasing the amounts of elemental phosphorus which can be converted into phosphine and commercially desirable phosphates. In the precursor process for producing phosphine by reaction of elemental phosphorus, water and alkali, the phosphate residue could not be commercially converted to marketable derivatives prior to the present invention. The instant process converts all of this phosphite residue into marketable products using only a relatively inexpensive reagent, phosphoric acid.

The following examples are given to illustrate the invention and are not deemed to be limitative of it.

*Example 1*

PYROLYSIS OF SODIUM HYPOPHOSPHITE

Finely ground sodium hypophosphite monohydrate (3.00 g., 0.283 mole) was placed in a 100-ml. single-necked, round-bottom flask filled with a nitrogen inlet tube and gas exit tube. A cold trap was used to remove any $P_2H_4$ formed. The flask and contents were heated by means of a controlled heating bath. The charge melted at 286° C. and phosphine evolution occurred at 310 to 316° C. The temperature was held in this range for about 1 hour. The yield of phosphine was 0.365 g. corresponding to a 38.0% conversion of hypophosphite phosphorus to phosphine. The residue contained phosphite.

Example 2
REACTION OF SODIUM HYPOPHOSPHITE WITH $H_3PO_4$

Sodium hypophosphite monohydrate (3.00 g., 0.0283 mole) was mixed with 1.9 ml. (0.0283 mole) of 85% orthophosphoric acid. The mixture was heated by the procedure of Example 1. Phosphine evolution was noted at about 230° C. and most of the phosphine had come off below 265° C. The yield of phosphine was 0.443 g. corresponding to a 46.0% conversion of hypophosphite phosphorus to phosphine. The residue was phosphite-free glass whose 1% water solution had a pH between 1 and 2.

Example 3
PYROLYSIS OF SODIUM ORTHOPHOSPHITE

Sodium orthophosphite pentahydrate (12.0 g., 0.0555 mole) was ground to a coarse powder and heated in the apparatus of Example 1. The material melted at 120° C., at 140° C. water began to come off and at 170° C. the sample had formed a hard white residue. The residue was heated to a maximum temperature of 410° C. without any evidence of phosphine evolution. The cooled residue gave a positive test for phosphite.

Example 4
REACTION OF SODIUM ORTHOPHOSPHITE WITH $H_3PO_4$

Sodium orthophosphite pentahydrate (12.0 g., 0.0555 mole) was mixed with 11.4 ml. (0.1655 mole) of 85% orthophosphoric acid and heated in the apparatus of Example 1. The temperature was raised to 400° C. over a 1.5-hour period and then cooled to 300° C. and held there for an hour before cooling to room temperature. Phosphine began coming off at about 310° C. The residue was a clear, colorless, phosphite-free glass whose 1% water solution had a pH between 1 and 2. The phosphine yield was 0.3365 g. corresponding to a 17.8% conversion of orthophosphite phosphorus to phosphine.

Example 5
COMBINED HYDROLYSIS AND REACTION WITH ACID

White phosphorus (10.0 ml., 0.563 g. atom) was placed under 25 ml. of anhydrous methyl alcohol in a three-liter, three-necked, round bottomed flask fitted with a magnetic stirrer, dropping funnel with pressure equalizer tube, nitrogen inlet tube, reflux condenser and a gas exit tube. A solution of 20.7 ml. of 50% sodium hydroxide in 166 ml. of anhydrous methyl alcohol (0.394 mole sodium hydroxide) was placed in the dropping funnel and the system purged with nitrogen. The methyl alcohol-phosphorus mixture was maintained at 50° C. by means of a water bath, and while stirring vigorously, the alcoholic sodium hydroxide solution was added dropwise over a 30-minute period. The reaction was substantially complete after an hour. A yield of 4.75 g. of phosphine was obtained corresponding to a 24.7% conversion of phosphorus to phosphine.

The residue remaining in the flask was treated with 70 ml. of 85% orthophosphoric acid and the methyl alcohol stripped off under vacuum. The system was then purged with nitrogen and the residue heated by means of a controlled heating bath. At about 180° C. phosphine began to evolve and the bulk of the phosphine came off at 240–260° C. The temperature was taken to 400° C. and then allowed to cool to room temperature. The total reaction time was 1.5 hours. The phosphine yield was 5.44 g.

The clear, colorless, glassy phosphate residue was free of phosphites and had a total $P_2O_5$ content of 86.9%. The pH of a 1% aqueous solution was between 1 and 2.

Example 6
REACTION OF POTASSIUM HYPOPHOSPHITE WITH $H_3PO_4$

In the same manner as Example 2, 2.95 g. of potassium hypophosphite (0.283 mole) was mixed with 1.9 ml. (.0283 mole) of 85% orthophosphoric acid and heated. Phosphine was evolved at about 250° C. The yield of phosphine was in the same range as obtained in Example 2. The residue was a phosphite-free glass whose 1% water solution had a pH between 1 and 2.

Example 7
REACTION OF SODIUM ORTHOPHOSPHITE WITH PYROPHOSPHORIC ACID

Sodium orthophosphite pentahydrate 12.0 g. (0.555 mole) was mixed with 14.86 g. (0.835 mole) of crystalline pyrophosphoric acid and heated in the apparatus of Example 1. The mixture was heated to 400° C. in 35 minutes, allowed to cool to 300° C., and maintained at the temperature for 1 hour. Phosphine evolution was noted at 300° C. The remainder of the phosphine was evolved at this temperature and left a clear, colorless, glassy residue. The residue was a phosphite-free glass whose 1% water solution had a pH between 1 and 2.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The process of producing phosphine and a phosphite-free, condensed, phosphoric acid glass from a salt selected from the group consisting of hypophosphite and orthophosphite salts, said salts having alkali metal cations selected from the group consisting of sodium and potassium, which comprises adding phosphoric acid to said salts and heating said salts with said phosphoric acid, said hypophosphite salt being heated to temperatures of from about 190° to 310° C., said orthophosphite salts being heated to temperatures of from about 300° to about 400° C., and recovering said phosphine and a phosphite-free, condensed phosphoric acid glass whose 1% solution in water has a pH of from about 1 to about 2.

2. The process of producing phosphine and a phosphite-free condensed phosphoric acid glass from salts selected from the group consisting of sodium hypophosphite and sodium orthophosphite which comprises adding phosphoric acid to said salts and heating said salts with said phosphoric acid, said sodium hypophosphite being heated to temperatures of from about 190° to about 310° C., said sodium orthophosphite being heated to temperatures of from about 300° to about 400° C., and recovering said phosphine and a phosphite-free, condensed phosphoric acid glass whose 1% solution in water has a pH of from about 1 to about 2.

3. The process of claim 1, wherein from 1 to 3 moles of phosphoric acid are employed.

4. The process of producing phosphine and a phosphite-free, condensed phosphoric acid glass from sodium hypophosphite which comprises adding phosphoric acid to said sodium hypophosphite, heating said sodium hypophosphite with said phosphoric acid to temperatures of from about 190° to 310° C., and recovering said phosphine and a phosphite-free, condensed phosphoric acid glass whose 1% solution in water has a pH of from about 1 to about 2.

5. The process of producing phosphine and a phosphite-free, condensed phosphoric acid glass from sodium orthophosphite which comprises adding phosphoric acid to said sodium orthophosphite, heating said sodium orthophosphite with said phosphoric acid to temperatures of from about 300° to 400° C., and recovering said phosphine and a phosphite-free, condensed phosphoric acid glass whose 1% solution in water has a pH of from about 1 to about 2.

6. The process of claim 4 in which the added acid is orthophosphoric acid.

7. The process of claim 5 in which the added acid is orthophosphoric acid.

References Cited in the file of this patent

Merlin: "Chemical Abstracts," column 39 $d$–$e$, vol. 50, 1956.

Phosphorus and Its Compounds, Van Wazer, vol. 1, Chemistry, pages 359–367, specifically 362 and 364, Interscience Publishers, Inc., New York, N.Y., 1958.

"Chemical Abstracts," columns 14,600$h$ and 14,601$a$, vol. 54, 1960.